(12) United States Patent
Bogema et al.

(10) Patent No.: US 8,510,020 B2
(45) Date of Patent: *Aug. 13, 2013

(54) CONTROLLING OF A VEHICLE RESPONSIVE TO REDUCTANT CONDITIONS

(75) Inventors: John Paul Bogema, Flat Rock, MI (US); Bret Alan Zimmerman, Grosse Pointe Farms, MI (US); Michiel J. Van Nieuwstadt, Ann Arbor, MI (US); Ed Kulik, Plymouth, MI (US); James Edwin Blatchford, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/370,220

(22) Filed: Feb. 9, 2012

(65) Prior Publication Data

US 2012/0143450 A1 Jun. 7, 2012

Related U.S. Application Data

(63) Continuation of application No. 12/477,327, filed on Jun. 3, 2009, now Pat. No. 8,116,961.

(51) Int. Cl.
*B60T 7/12* (2006.01)
(52) U.S. Cl.
USPC ............ 701/103; 701/108; 60/286; 60/288
(58) Field of Classification Search
USPC .......................... 701/103, 108; 60/286, 288
See application file for complete search history.

(56) References Cited

U.S. PATENT DOCUMENTS

| | | | |
|---|---|---|---|
| 6,063,350 A | 5/2000 | Tarabulski et al. | |
| 6,192,677 B1 | 2/2001 | Tost | |
| 6,408,619 B1 | 6/2002 | Wissler et al. | |
| 6,637,196 B1 | 10/2003 | Tost | |
| 6,912,846 B2 | 7/2005 | Huber et al. | |
| 6,941,746 B2 | 9/2005 | Tarabulski et al. | |
| 7,721,533 B2 * | 5/2010 | Imoehl et al. | 60/286 |
| 7,726,118 B2 * | 6/2010 | Oberski et al. | 60/286 |
| 7,770,384 B2 * | 8/2010 | Oberski et al. | 60/286 |
| 7,775,036 B2 | 8/2010 | Barcin | |
| 7,826,957 B2 * | 11/2010 | Fabien | 701/103 |
| 7,925,418 B2 | 4/2011 | Fabien | |
| 7,954,312 B2 * | 6/2011 | Gresens | 60/286 |
| 8,015,801 B2 * | 9/2011 | Oberski et al. | 60/286 |
| 8,116,961 B2 * | 2/2012 | Bogema et al. | 701/103 |
| 8,141,346 B2 * | 3/2012 | Shaikh et al. | 60/286 |
| 8,209,961 B2 * | 7/2012 | Oberski et al. | 60/286 |
| 2007/0079601 A1 | 4/2007 | Hirata et al. | |
| 2007/0273494 A1 | 11/2007 | Dittrich et al. | |
| 2008/0035106 A1 * | 2/2008 | Stein | 123/304 |
| 2008/0110158 A1 | 5/2008 | Esaka | |
| 2008/0276598 A1 | 11/2008 | Gresens | |
| 2009/0210135 A1 * | 8/2009 | Miyata et al. | 701/103 |
| 2009/0314071 A1 * | 12/2009 | Mukai | 73/114.38 |

* cited by examiner

*Primary Examiner* — Toan To
(74) *Attorney, Agent, or Firm* — Julia Voutyras; Alleman Hall McCoy Russell & Tuttle LLP (57) ABSTRACT

Controlling a vehicle responsive to reductant conditions is provided. The method for controlling a vehicle having an engine with an exhaust, the exhaust having a reductant injection system including a reductant storage vessel, the engine further having a fuel system including a fuel storage vessel, may include under degraded reductant conditions, restricting vehicle motion in response to a fuel refill of the fuel storage vessel.

16 Claims, 6 Drawing Sheets

CONTROLLING OF A VEHICLE RESPONSIVE TO REDUCTANT CONDITIONS

CROSS REFERENCE TO RELATED APPLICATIONS

The present application is a continuation of U.S. patent application Ser. No. 12/477,327 filed Jun. 3, 2009, the entire contents of which are incorporated herein by reference for all purposes.

TECHNICAL FIELD

The present description relates generally to controlling of a vehicle in response to reductant conditions for an exhaust treatment system for a diesel engine.

BACKGROUND AND SUMMARY

Nitrogen oxides, such as NO and $NO_2$ (collectively referred to as NOx), generated in the high temperature and high pressure conditions of an internal combustion engine, may constitute a large percentage of total exhaust emissions. Accordingly, engine exhaust systems may utilize selective catalytic reduction (SCR) to reduce the NOx species to diatomic nitrogen and water. To meet new lower NOx level requirements, many internal combustion engine vehicles are using a separate reductant (i.e., reducing agent) stored in the vehicle. In the United States, the Environmental Protection Agency requires that a customer be informed of the level of reductant in the reductant tank, and that the manufacturer compel the vehicle operator to refill the reductant tank before empty, to maintain proper emissions control.

Previous solutions include limiting engine speed as the reductant becomes scarce, and preventing a restart of the vehicle if the reductant tank is empty. The inventors of the present application have recognized a problem in such previous solutions, in that completely disabling the engine may cause inconvenience to the vehicle operator, in that the vehicle may be made inoperable when the vehicle operator is in a rural area without easy access to reductant. Further, preventing restart of the vehicle may reduce the comfort of the vehicle's occupants.

In one example, some of the above issues may be addressed by a method for controlling a vehicle having an engine with an exhaust, the exhaust having a reductant injection system including a reductant storage vessel, the engine further having a fuel system including a fuel storage vessel, the method comprising, under degraded reductant conditions, restricting vehicle motion in response to a fuel refill of the fuel storage vessel. The degraded reductant conditions may include the level of stored reductant being below a threshold, and/or the stored reductant having improper make-up (e.g., a reductant storage vessel is filled with water, not reductant).

By restricting vehicle motion in response to a fuel refill, there is a higher likelihood that the vehicle operator is at a location where reductant (e.g., urea) is available, such as at a service station. Further, it may also be likely that having just filled the fuel storage vessel, the vehicle operator may be motivated to simply obtain the reductant while at the service station. Additionally, although such restricting of vehicle motion may limit transmission drive gear engagement, for example, engine idling may still be enabled, thus enabling HVAC operation for the vehicle operator and passengers. Further, in some embodiments, a vehicle operator may issue an override command to override vehicle restriction of vehicle motion under selected conditions. By allowing such an override, it may again be possible to accommodate unusual circumstances and give the vehicle operator more opportunity to refill the reductant storage vessel. Further still, in some embodiments, messages issued to the vehicle operator may be tied to future levels of restriction. For example, such messages may indicate a future action that will be implemented as a consequence for not refilling the reductant storage vessel when degraded reductant conditions are present.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

As described above, to meet new lower NOx level requirements, many internal combustion engine vehicles use a separate reductant stored in the vehicle. Typically, a vehicle operator is not only informed of the level of reductant in the reductant storage vessel, but the vehicle may be configured by the manufacturer to compel the vehicle operator to refill the reductant storage vessel before empty in order to maintain proper emissions control. Accordingly, the present disclosure describes various methods for controlling a vehicle, based on the availability and/or make-up of reductant in a reductant storage vessel. For example, in response to degraded reductant conditions, such as a low level of reductant, driver inducing actions may be carried out. As described with reference to FIGS. 4-6, various actions aimed at motivating the vehicle operator to address the reductant issue, such as restricting the speed of the vehicle, may be implemented. If the speed restriction is insufficient motivation to the vehicle operator, still further action may include, upon detecting a fuel refill event, completely restricting motion of the vehicle, yet still enabling engine idling. By implementing the motion restriction in response to the occurrence of a fuel refill (i.e., refueling) event, it is likely that the vehicle is at a service station or other such location providing reductant as well as fuel, and therefore the vehicle operator will have easy access to reductant.

Figure 1:
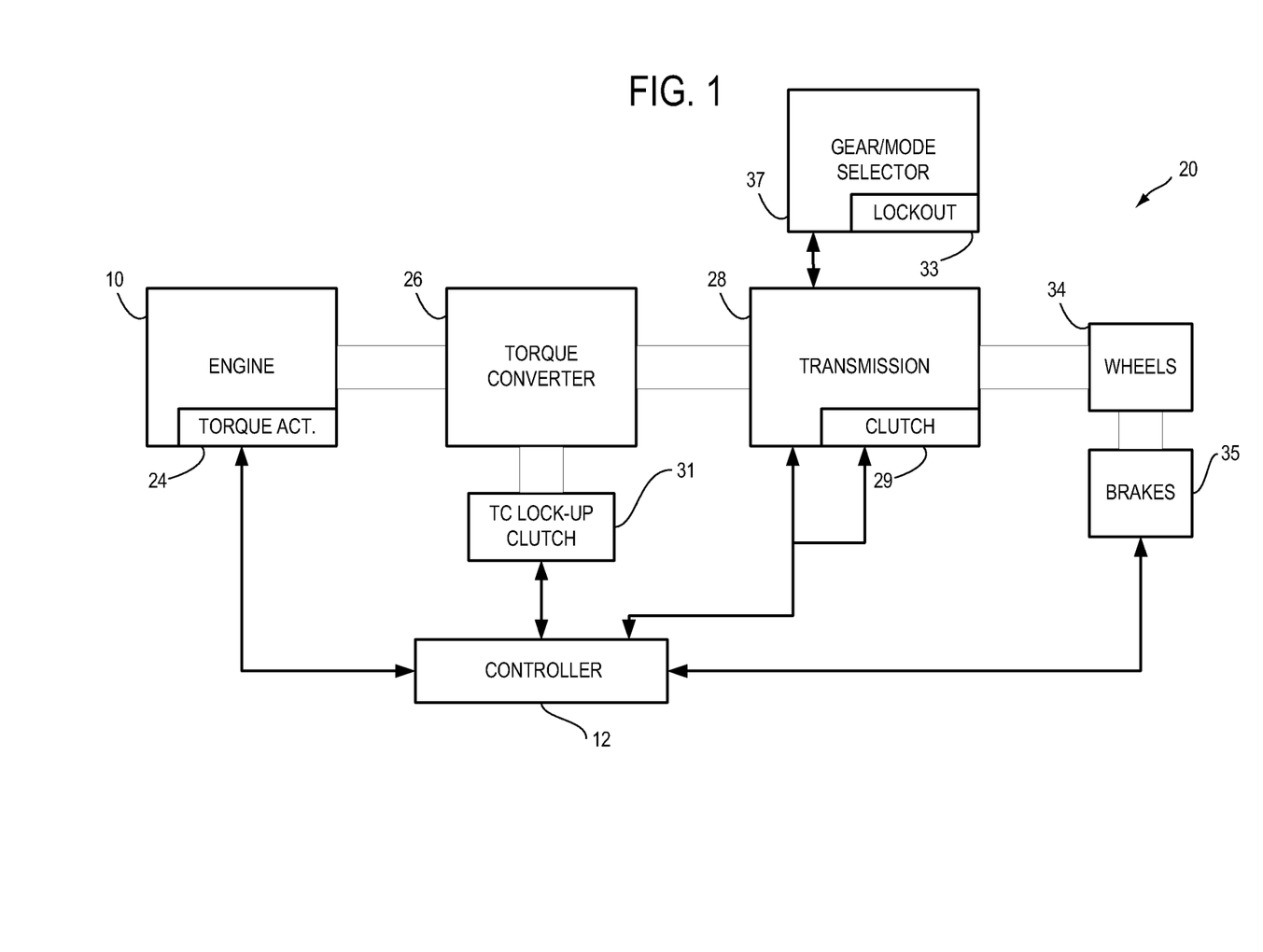
FIG. 1 shows a block diagram schematic of an embodiment of a vehicle powertrain.

The disclosed methods for controlling a vehicle are linked to a vehicle having an engine with an exhaust, the exhaust having a reductant injection system including a reductant storage vessel, and the engine further having a fuel system including a fuel storage vessel. An embodiment of such an engine is shown in FIG. 1, for the case of a diesel engine. FIG.

1 shows a block diagram of an example system 20 of a vehicle. System 20 may be powered by an engine 10. In one example, engine 10 may be a diesel engine. In alternate embodiments, other engine configurations may be employed, for example a gasoline engine.

Engine torque may be transmitted to torque converter 26 to drive a transmission 28 by engaging one or more clutches, including clutch 29. A vehicle comprising a system such as system 20 may be immobilized by the control system upon the control system determining that degraded reductant conditions are present, as described in more detail hereafter with reference to FIGS. 4-6. Such immobilization may include the control system automatically disengaging clutch 29, such that transmission 28 remains in a neutral mode and is prevented from entering a drive mode, even if a vehicle operator shifts the vehicle into a drive mode. As such, the control system allows engine 10 to start in response to an operator start request. Further, the control system enables HVAC operations within the vehicle, but with transmission 28 restricted from torque transmitting mode, such as having a drive gear engaged.

In some cases, the control system may further engage a lockout 33 of a gear/mode selector 37 to prevent a vehicle operator from selecting a drive mode in response to degraded reductant conditions, such as a low level of reductant, thus preventing shifting of transmission 28 into a drive mode. In other cases, transmission 28 may be a manual transmission and accordingly, system 20 may then not include torque converter 26. In such a system, the control system may engage lockout 33 of gear/mode selector 37 in response to degraded reductant conditions, preventing shifting into a drive mode.

An electronic controller 12 may be configured to receive a plurality of engine operating parameters from engine 10, torque converter lock-up clutch 31 (e.g., engagement pressure, torque converter slip), transmission 28 (e.g., clutch engagement pressure, automatic transmission output torque), wheels 34 (e.g., driveline speed, driveline torque), and wheel brakes 35 (e.g., caliper wear). Controller 12 is discussed in more detail hereafter, with reference to FIG. 2.

Figure 2:
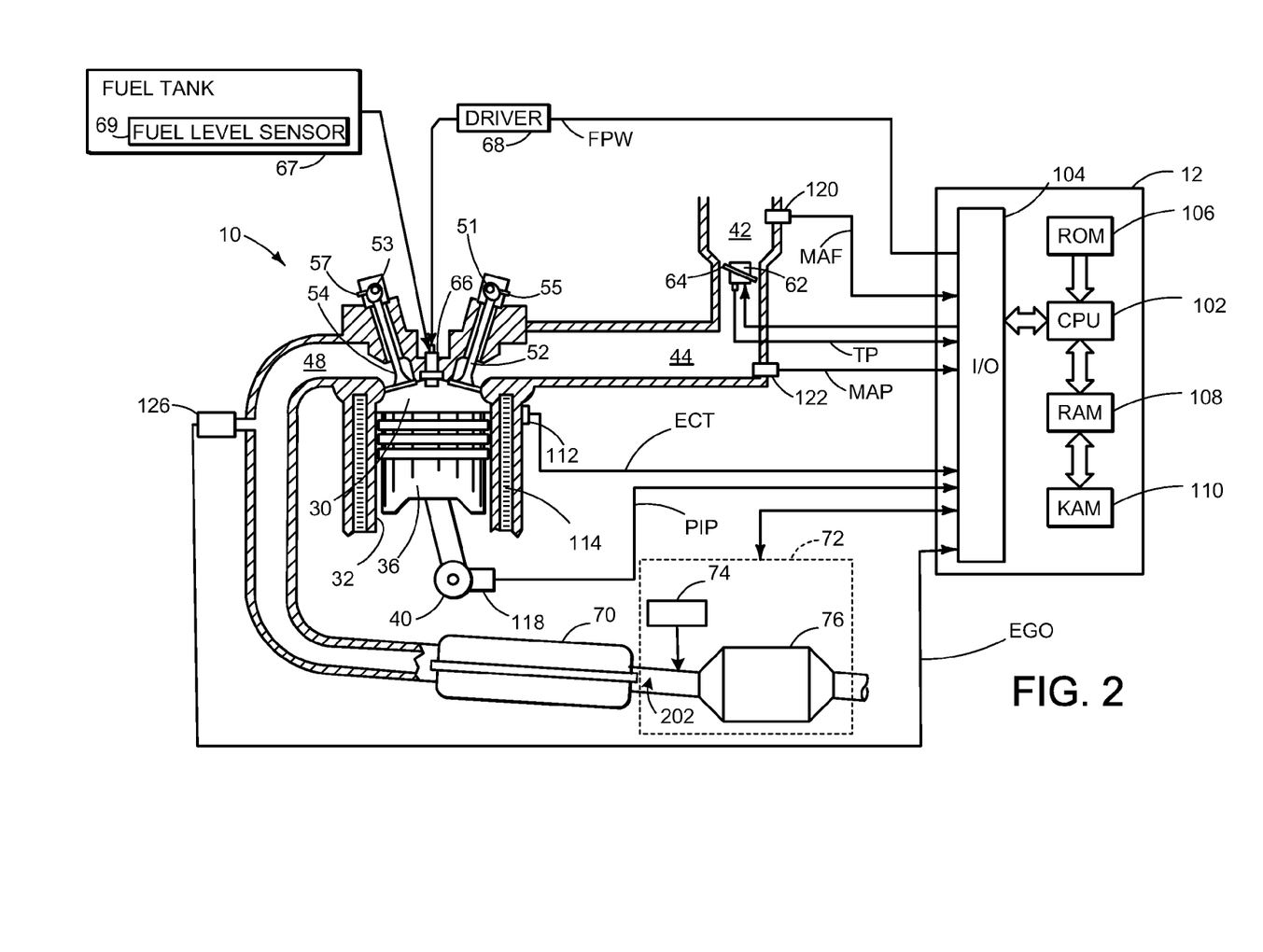
FIG. 2 shows an embodiment of an internal combustion engine and control system.

Referring now to FIG. 2, direct injection internal combustion engine 10, comprising a plurality of combustion chambers and controlled by electronic engine controller 12, is shown. Combustion chamber 30 of engine 10 includes combustion chamber walls 32 with piston 36 positioned therein and connected to crankshaft 40. In one example, piston 36 includes a recess or bowl (not shown) to form selected levels of stratification or homogenization of charges of air and fuel. Alternatively, a flat piston may also be used.

Combustion chamber 30 is shown communicating with intake manifold 44 and exhaust manifold 48 via intake valve 52, and exhaust valve 54. Fuel injector 66 is shown directly coupled to combustion chamber 30 for delivering liquid fuel directly therein in proportion to the pulse width of signal FPW received from controller 12 via conventional electronic driver 68. Fuel may be delivered to fuel injector 66 by a fuel system including a fuel tank 67, a fuel pump (not shown), and a fuel rail (not shown). Fuel tank 67 is an example fuel storage vessel, and may further include a fuel level sensor 69 configured to detect a level of fuel within fuel tank 67 used for detecting a fuel refill of the fuel tank. In some embodiments, engine 10 may include a plurality of combustion chambers each having a plurality of intake and/or exhaust valves.

Intake valve 52 may be controlled by controller 12 via variable valve operation actuator 51. Similarly, exhaust valve 54 may be controlled by controller 12 via variable valve operation actuator 53. During some conditions, controller 12 may vary the signals provided to actuators 51 and 53 to control the opening and closing of the respective intake and exhaust valves. The position of intake valve 52 and exhaust valve 54 may be determined by valve timing sensors 55 and 57, respectively. In example embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Controller 12 activates fuel injector 66 so that a desired air-fuel ratio mixture is formed. Controller 12 controls the amount of fuel delivered by fuel injector 66 so that the air-fuel ratio mixture in combustion chamber 30 can be selected to be substantially at (or near) stoichiometry, a value rich of stoichiometry, or a value lean of stoichiometry. Further, controller 12 is configured to activate fuel injector 66 so that multiple fuel injections may be performed during a cycle.

Exhaust manifold gas sensor 126 is shown coupled to exhaust manifold 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Catalytic converter 70 is shown in communication with exhaust manifold 48. In some embodiments, catalytic converter 70 may be a diesel oxidation catalyst. An emission control system 72 is shown downstream catalytic converter 70. Emission control system 72 may include reductant storage vessel 74 and emission control device 76. Emission control device 76 is shown in communication with catalytic converter 70. Reductant storage vessel 74 may supply a reductant to an exhaust stream 202 entering emission control device 76. Emission control system 72 is described in more detail in FIG. 3.

Controller 12 is shown in FIG. 2 as a microcomputer including: microprocessor unit 102, input/output ports 104, an electronic storage medium of executing programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor; and absolute Manifold Pressure Signal MAP from sensor 122. Engine speed signal RPM is generated by controller 12 from signal PIP in a conventional manner and manifold pressure signal MAP provides an indication of engine load. Controller 12 is configured to control emission control system 72. Further, emission control system 72 may send feedback to controller 12. This feature is described in more detail below.

Combustion in engine 10 can be of various types, depending on operating conditions. While FIG. 2 depicts a compression ignition engine, it will be appreciated that the embodiments described below may be used in various engines, including but not limited to, diesel and gasoline compression ignition engines, spark ignition engines, direct or port injection engines, etc. Further, various fuels and/or fuel mixtures such as gasoline, diesel, H2, ethanol, methane, and/or combinations thereof may be used.

As described above, FIG. 2 shows only one cylinder of a multi-cylinder engine, and each cylinder may similarly include its own set of intake/exhaust valves, fuel injector, spark plug, etc.

Figure 3:
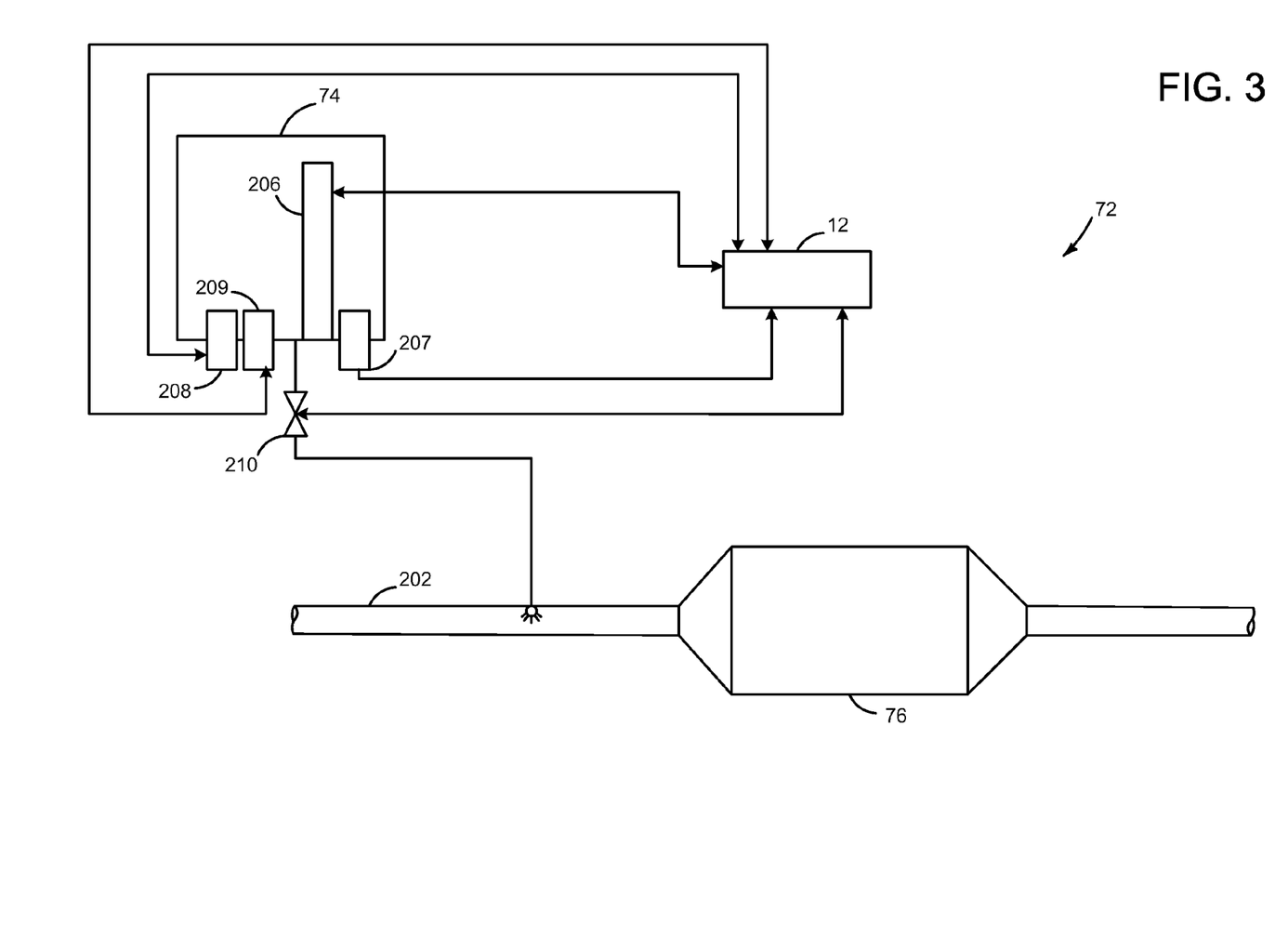
FIG. 3 shows an embodiment of an emission control system.

FIG. 3 shows an example of emissions control system 72 of engine 10 in more detail. Generally, the components described herein may operate to determine the availability and make-up of a fluid stored in a reductant storage vessel, such as reductant storage vessel 74. In particular, the emission control system may be monitored by various components to determine a physical condition associated with a measure of fluid stored in the reductant storage vessel to determine the availability of a fluid and a property of the stored fluid to determine the make-up of the fluid. As shown in FIG. 3, emission control system 72 may include reductant storage vessel 74 configured to selectively supply a reductant to emission control device 76. Further, emission control system 72 may include controller 12 configured to process information within the emission control system from various components.

Reductant storage vessel 74 may be an on-board storage device for storing a reductant used in emission control device 76. The reductant storage vessel may include a plurality of sensors. In particular, the emission control system may include a first sensor for determining a physical condition associated with a measure of fluid stored in the reductant storage vessel, and a second sensor for determining a property of a fluid stored in the reductant storage vessel. Further, a physical condition associated with a measure of stored fluid may be coordinated with a property of the stored fluid to determine the availability and make-up of reductant for reducing NOx in the emission control system.

In some embodiments, the first sensor may detect one or more conditions of the reductant storage vessel that may be coordinated to determine a physical condition of the reductant storage vessel. For example, the first sensor may detect a level and a pressure in the reductant storage vessel. Specifically, the level and pressure may be coordinated to determine a physical condition, such as a measure of fluid in the reductant storage vessel. More specifically, the first sensor may coordinate a detected level with a detected pressure to determine whether or not the reductant storage vessel may be empty. In another embodiment, the first sensor may be a first sensor group including a plurality of sensors. For example, the first sensor group may include a level sensor 206 and a pressure sensor 207 that may be separate from the level sensor. As such, feedback from the sensors may be correlated to determine a physical condition of the reductant storage vessel.

Similarly, the second sensor may detect one or more properties of the reductant storage vessel that may be coordinated to determine a characteristic of a fluid stored in the reductant storage vessel. For example, the second sensor may detect a thermal conductivity and a permittivity of the stored fluid, where the thermal conductivity and permittivity may be coordinated to determine a characteristic of the fluid, such as a concentration. More specifically, the second sensor may coordinate a detected thermal conductivity (e.g., by measuring temperature, resistance, etc.) with a detected permittivity (e.g., by measuring dielectric constant, capacitance, etc.) to determine whether or not the concentration of reductant in a stored fluid may be associated with a proper reductant. It may be understood that various other properties associated with the fluid may be detected to determine a characteristic of the stored fluid, including but not limited to electrical conductivity, viscosity, opacity, and acidity. In another embodiment, the second sensor may be a second sensor group including a plurality of sensors. For example, the first sensor group may include a thermal conductivity sensor 208 and a permittivity sensor 209 that may be separate from the conductivity sensor. As such, feedback from the sensors may be correlated to determine a characteristic of the fluid stored in the reductant storage vessel.

Controller 12 may receive feedback from the sensors to determine the availability and make-up of the stored fluid. In particular, controller 12 may determine whether or not a measure of fluid may be stored in the reductant storage vessel and whether or not the properties of the fluid correspond to a proper reductant. It may be appreciated that feedback including information on a physical condition of the reductant storage vessel based on multiple conditions sensors and a characteristic of the stored fluid based on multiple detected properties from the sensors described above may verify the availability and make-up of a reductant to reduce NOx in the exhaust. In this way, the emission control system may monitor the reductant storage vessel so as to facilitate reduction of NOx and verify that the fluid may be a reductant available in a sufficient amount.

Under some conditions, the reductant storage vessel may supply the stored fluid to the exhaust system upstream of the emission control device. In particular, it may be determined to supply an amount of reductant to emission control device 76 based on the availability and make-up of the stored fluid, as determined by the sensors, and further based on operating conditions. Accordingly, the controller may prompt a reductant valve 210 fluidically disposed along a conduit coupling the reductant storage vessel to the exhaust system to release an amount of reductant from the reductant storage vessel so as to substantially reduce NOx entering emission control device 76. As such, a reductant from the reductant storage vessel may be absorbed in emission control device 76 to reduce NOx in the exhaust stream.

In the embodiment described herein, the reductant may be urea, although various other reductants may also be used.

In the case of NOx reduction, emission control device 76 may utilize SCR to reduce the NOx species to diatomic nitrogen and water. In such a case, reductant storage vessel 74 may store a proper reductant for reducing NOx in the exhaust, such as liquid urea.

Storage medium read-only memory 106 can be programmed with computer readable data representing instructions executable by processor 102 for performing the methods described below as well as other variants that are anticipated but not specifically listed.

Figure 4:
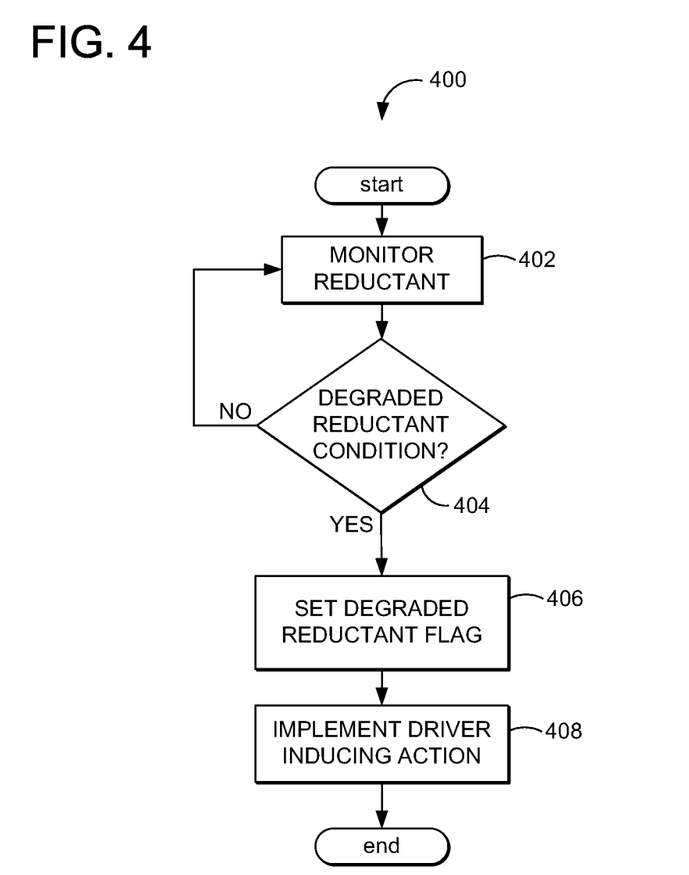
FIG. 4 shows a high level flow chart of an embodiment of a method of implementing a driver inducing action in response to degraded reductant conditions.

As described above, various inducement actions may be taken based on an amount of reductant in the reductant storage vessel and in response to various operating conditions. As an example, FIG. 4 shows a high level flow diagram of an embodiment of such a method 400 for controlling the vehicle, described in more detail as follows.

At 402, method 400 includes monitoring reductant availability and/or make-up, such as a storage level, reductant quality, etc. The reductant may be urea, however it is to be understood that other suitable reductants capable of reducing NOx emissions may be used. Such a reductant availability and/or make-up may be monitored by various methods, such as described above with regard to FIG. 3.

At 404, method 400 includes determining if a degraded reductant condition is present, for example, if the reductant availability is less than a threshold amount and/or if the reductant make-up differs sufficiently from a desired make-up. Such a determination may include, for example, comparing a measurement of the reductant level in the reductant storage vessel with a threshold value, and if the measurement is below the threshold value, then determining that the reductant level is low. In another embodiment, such a determination at 404 may include determining if other degraded reductant conditions are present. Such degraded reductant conditions may include determining that the reductant storage vessel is filled with an improper fluid, the reductant storage vessel is not filled at all, the reductant has improper characteristics and/or qualities, etc. As described above, whereas a proper reductant fluid (e.g., a proper urea reductant) is intended for use in the reductant storage vessel to reduce NOx emissions, an improper fluid has improper characteristics or qualities, such as water, and therefore may not reduce NOx emissions. For example, the routine may determine if the ammonia concentration of the reductant is less than a threshold concentration level.

If it is determined that degraded reductant conditions are not present, then method 400 returns to monitoring the reductant. Alternatively, if it is determined at 404 that degraded reductant conditions are present, then at 406, method 400 includes setting a flag that the reductant is low and/or degraded.

At 408, method 400 next includes implementing a driver inducing action. Such a driver inducing action may include displaying a message to a vehicle operator (i.e., a driver) of the vehicle to notify the driver of degraded reductant conditions, such as a low level of reductant. In some cases, the notification may include visually presenting to a driver a warning light and/or message on a display and/or generating an audio warning. The driver inducing action may further include restricting vehicle motion, for example, after a duration (e.g., number of miles or number or hours) of travel while degraded reductant conditions are present. Further, in some cases, messages displayed to the driver may not only indicate to the driver that degraded reductant conditions are present, but may also indicate a future action to be implemented automatically by the control system if the reductant storage vessel is not filled and/or the degraded reductant is not replaced. For example, such a message may indicate that the speed of the vehicle will be restricted after a certain number of miles are traveled under degraded reductant conditions. In another example, such a message may indicate that a drive mode may be prevented at a subsequent restart upon refueling the vehicle while the degraded reductant conditions are present, thus motivating a driver to fill the reductant storage vessel while at the gas station.

Figure 5:
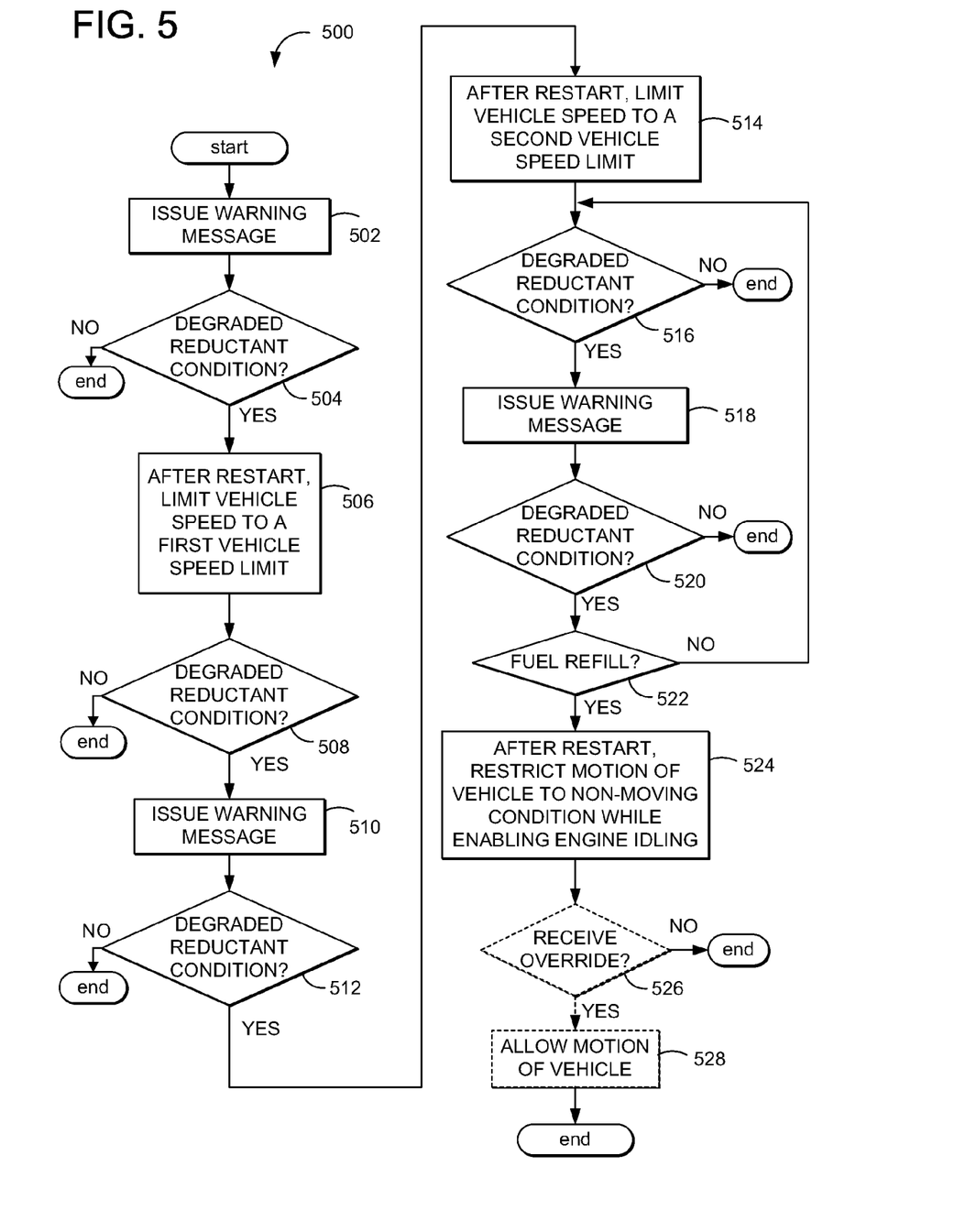
FIG. 5 shows a general flow chart of an embodiment of a method of implementing a driver inducing action.

In one particular example, described further with regard to FIG. 5, driver inducement actions may be stratified across various levels, with initially just notification messages followed by some vehicle restriction, and then followed by increasingly more restrictive action taken as the vehicle continues operation without corrective action (e.g., refill/replacement of the reductant). Further, the restrictive actions may be escalated in coordination with selected events. In one particular example, the restriction of vehicle motion may be increased from a first restriction level to a second restriction level in response to various events, such as a fuel refilling (i.e., refueling) event, an engine start event (e.g., a driver requested start following a driver requested engine/vehicle shut-down), combinations thereof, etc. The increasing restriction of vehicle motion may include significant restriction of vehicle motion in the situation following a fuel refill event, as there is a higher likelihood that the driver is at a location where the reductant (e.g., urea) is available, such as at a service station. Further, it may also be likely that having just filled the fuel storage vessel with fuel (e.g., diesel, gasoline, etc.), a driver may be motivated to simply obtain the reductant while at the service station.

Referring now to FIG. 5, FIG. 5 describes additional details of carrying out driver inducement actions, with different and/or additional actions taken as the vehicle operation is continued without refilling/replacement of the reductant.

Upon determining that a degraded reductant condition is present (e.g. based on the flag from FIG. 4) at 502 method 500 includes issuing a warning message. Such a warning message may audibly and/or visually notify a driver that degraded reductant conditions are present. For example, the warning message may indicate that the storage level in the reductant storage vessel is less than a threshold value, or "low". As described above, such a message may further indicate future vehicle restrictions that may be enacted after a selected duration. Such warning messages may indicate a number of miles that may be traveled, or duration of time that may pass, before a vehicle restriction will take effect. For example, the message may indicate that upon traveling 100 miles with a low level of reductant, a speed limit will be applied at a subsequent engine restart.

In some cases, a driver may be able to "reset" the warning message to suppress the audible and/or visual notification without suppressing the pending vehicle restriction. Furthermore, as described in more detail as follows, such future vehicle restrictions indicated in the warning messages may be of an increasingly restrictive action as the driver continues to drive even further while degraded reductant conditions are present.

At 504, method 500 next includes determining if degraded reductant conditions are present (via the flag of FIG. 4). If so, then, at 506, method 500 next includes, after engine restart, limiting vehicle speed to a first vehicle speed limit. Such a first vehicle speed limit may be a suitable speed limit that may compel a driver to proceed with refilling the reductant storage vessel, such as a speed limit of 55 mph.

Upon issuing a first vehicle restriction of a speed limit, at 508, method 500 next includes determining if degraded reductant conditions are still present. Upon determining that degraded reductant conditions are still present, at 510 method 500 next includes issuing another warning message. As described above such a message may not only indicate that degraded reductant conditions are present, but may further indicate a pending vehicle restriction due to the presence of the degraded reductant conditions. For example, the warning message may indicate that the speed of the vehicle will be further restricted at a subsequent restart after traveling a number of miles and/or hours without refilling the reductant storage vessel.

At 512, method 500 next includes determining if degraded reductant conditions are still present. If degraded reductant conditions are present, then at 514 method 500 includes, after restart, limiting vehicle speed to a second vehicle speed limit. In some embodiments, the second vehicle speed limit may be lower than the first vehicle speed limit, to further compel the driver to fill the reductant storage vessel. For example, if a first vehicle speed limit was 55 mph, then the second vehicle speed limit may be 50 mph.

Further, in some embodiments, limiting vehicle speed to a second vehicle speed limit may occur after a selected duration. For example, the selected duration may be a selected number of miles traveled since limiting the speed to the first vehicle speed limit, or a selected number of hours traveled since limiting the speed to the first vehicle speed limit, or a selected number of resets performed since limiting the speed to the first vehicle speed limit.

At 516, method 500 next includes determining if degraded reductant conditions are still present. Upon determining that degraded reductant conditions are present, at 518 method 500 includes issuing another warning message. Such a warning message may indicate a more restrictive future consequence, such as the motion of the vehicle being restricted upon restart following a subsequent refueling event. As described above, by restricting vehicle motion in response to a fuel refill, there is a higher likelihood that the driver is at a location where reductant (e.g., urea) is available, such as at a service station.

At 520, method 500 next includes determining if degraded reductant conditions are still present. Upon determining that degraded reductant conditions are still present, at 522 method 500 next includes determining if a fuel vessel has been refilled. Such a determination may be made in any suitable manner, for example, the determination may be based on detecting an increase in a fuel level in a fuel storage vessel, detecting a fuel door opening, detecting flow of fuel in the filler neck, etc. An example approach is described hereafter with reference to FIG. 6.

If it is determined that the fuel vessel has not been refilled, then the vehicle may continue to be driven at speeds below a second vehicle speed limit as indicated at 514. However, if it is determined that the fuel vessel has been refilled, then at 524 method 500 includes, after restart, restricting motion of the vehicle to non-moving condition while enabling engine idling.

As described above, by basing at least some restriction of vehicle motion, and in particular an escalation of vehicle motion restriction, on a fuel refill event, there is a higher likelihood that the driver is at a location where the reductant is available and thus will be sufficiently motivated to refill the reductant storage vessel. Further, by allowing the engine to idle, HVAC operation may be enabled during idling, increasing comfort of a driver and/or passengers of the vehicle in case reductant is not readily available.

In some embodiments, method 500 may optionally include at 526 determining if an override command overriding the non-moving condition has been received, and if so, at 528 allowing transmission drive gear engagement. By allowing a driver to initiate an override of the motion restriction, a driver may continue with driving the vehicle. In some embodiments, such allowing of vehicle motion may include allowing the vehicle to travel at speeds under a selected speed limit. Further, in some embodiments, upon utilizing such an override option, vehicle motion may be restricted upon a subsequent restart. In other words, a driver may have a limited number of times in which the driver may perform an override.

Figure 6:
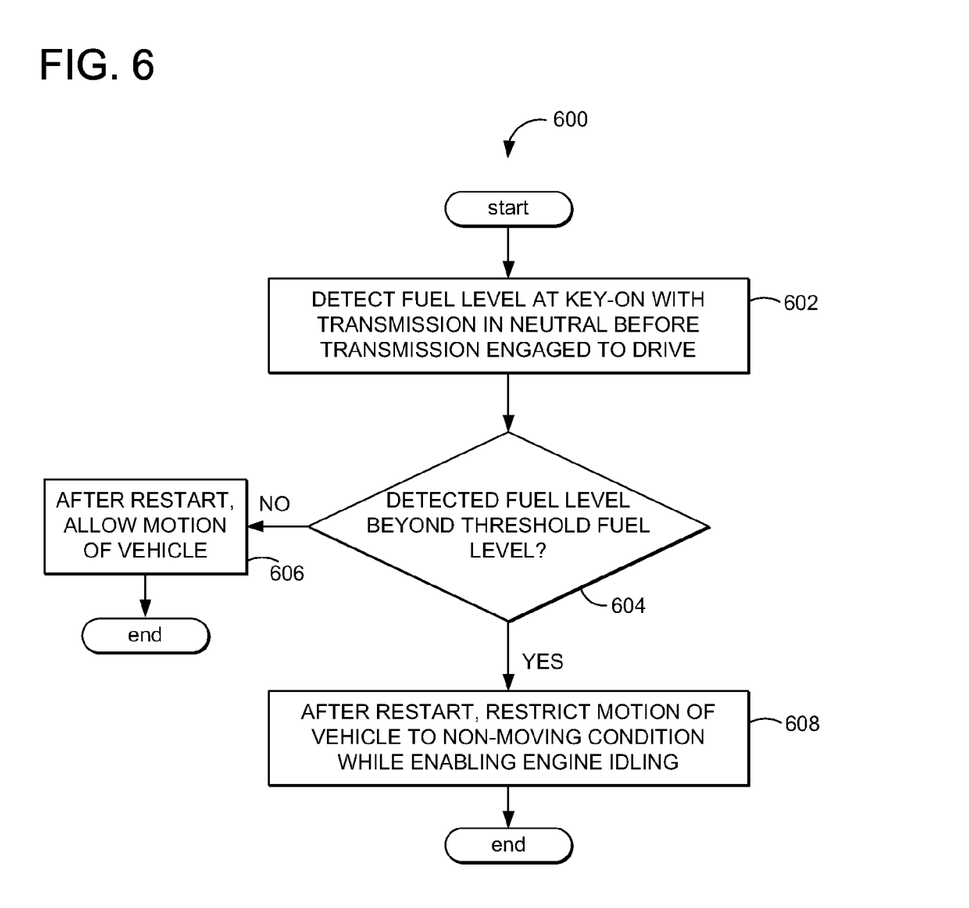
FIG. 6 shows a high level flow chart of an embodiment of a method of fuel refill detection.

As described above, the methods disclosed herein include restricting vehicle motion under degraded reductant conditions in response to a fuel refill of the fuel storage vessel. Detection of a fuel refill of the fuel storage vessel may be performed according to various suitable methods, such as detecting an increase in a fuel level in a fuel storage vessel, detecting a fuel door opening, detecting flow of fuel in the filler neck, combinations thereof, and the like. An example of such an approach is illustrated in FIG. 6 for example method 600. At 602, method 600 includes detecting a fuel level at key-on with the transmission in neutral before the transmission is engaged to drive. At 604, method 600 includes determining if the detected fuel level is beyond a threshold fuel level. In other words, such a detection may indicate if the fuel vessel has been refilled beyond a threshold fuel level. If it is determined that the detected fuel level is not beyond a threshold fuel level (i.e., the fuel vessel has not been refilled) then a fuel refill has not been detected and motion of a vehicle may not be restricted, as indicated at 606.

However, if it is determined that the detected fuel level is beyond a threshold fuel level (i.e., the fuel vessel has been refilled), then at 608 method 600 includes, after restart, restricting motion of the vehicle to a non-moving condition while enabling engine idling. As described above with reference to FIG. 5, in some embodiments, restricting vehicle motion may include restricting vehicle motion upon an engine restart following the fuel refill. Further, in some embodiments restricting vehicle motion may include limiting transmission drive gear engagement while enabling engine idling. As such, the engine may be allowed to idle during the restricted vehicle motion. By allowing the engine to idle, HVAC operation may be enabled during idling, increasing comfort of a driver and/or passengers of the vehicle.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a vehicle having an engine with an exhaust, an exhaust reductant injection system including a reductant storage vessel, and a fuel system including a fuel storage vessel, comprising:

under degraded reductant conditions, restricting vehicle motion in response to a fuel refill of the fuel storage vessel while enabling engine idling and enabling HVAC operation.

2. The method of claim 1, wherein the degraded reductant conditions include availability of a reductant stored in the reductant storage vessel being below a threshold.

3. The method of claim 1, wherein the degraded reductant conditions include a reductant stored in the reductant storage vessel having a degraded make-up.

4. The method of claim 1, wherein restricting vehicle motion includes restricting vehicle motion upon an engine restart following the fuel refill.

5. The method of claim 1, wherein restricting vehicle motion includes limiting transmission drive gear engagement.

6. The method of claim 1, wherein restricting vehicle motion includes limiting vehicle speed.

7. The method of claim 1, further comprising identifying the fuel refill before an engine restart, and then limiting vehicle motion during the engine restart.

8. A method for controlling a vehicle having an engine with an exhaust, the exhaust having a reductant injection system including a reductant storage vessel, the engine further having a fuel system including a fuel storage vessel, the method comprising:
when degraded reductant conditions are present, limiting vehicle speed to a first vehicle speed limit;
after a restart following the limitation at the first vehicle speed limit in which degraded reductant conditions are still present, limiting vehicle speed to a second vehicle speed limit; and
after a restart following the limitation at the second vehicle speed limit in which degraded reductant conditions are still present and in which the fuel storage vessel has been refilled beyond a threshold fuel level, restricting motion of the vehicle to non-moving condition while enabling engine idling operation and enabling HVAC operation.

9. The method of claim 8, wherein the second vehicle speed limit is lower than the first vehicle speed limit.

10. The method of claim 8, wherein restricting motion of the vehicle to non-moving condition includes limiting transmission drive gear engagement while enabling engine idling.

11. The method of claim 8, wherein the degraded reductant conditions include an amount of a proper urea reductant stored in the reductant storage vessel being less than a threshold amount.

12. A method for controlling a vehicle having an engine with an exhaust, the exhaust having a reductant injection system including a reductant storage vessel, the engine further having a fuel system including a fuel storage vessel, the method comprising:
when an amount of a proper urea reductant stored in the reductant storage vessel is less than a threshold amount, issuing a first warning message indicating a first vehicle speed limit to be applied;
if the amount of the proper urea reductant stored in the reductant storage vessel is still less than the threshold amount, limiting vehicle speed to the first vehicle speed limit;
after a restart following the limitation at the first vehicle speed limit in which the amount of the proper urea reductant stored in the reductant storage vessel is still less than the threshold amount and after a selected duration, issuing a second warning message indicating a second vehicle speed limit to be applied, and if the amount of the proper urea reductant stored in the reductant storage vessel is still less than the threshold amount, limiting vehicle speed to the second vehicle speed limit;
after a restart following the limitation at the second vehicle speed limit in which the amount of the proper urea reductant stored in the reductant storage vessel is still less than the threshold amount, issuing a third warning message indicating restriction of motion to be applied upon detecting a refueling event; and
if the amount of the proper urea reductant stored in the reductant storage vessel is still less than the threshold amount and upon detecting the refueling event, restricting motion of the vehicle to non-moving condition while enabling engine idling operation and enabling HVAC operation.

13. The method of claim 12, wherein the selected duration includes a selected number of miles traveled since limiting vehicle speed to the first vehicle speed limit.

14. The method of claim 12, wherein the selected duration includes a selected number of hours traveled since limiting vehicle speed to the first vehicle speed limit.

15. The method of claim 12, wherein the selected duration includes a selected number of resets performed since limiting vehicle speed to the first vehicle speed limit.

16. The method of claim 12, further comprising after restricting motion of the vehicle to non-moving condition while enabling engine idling allowing vehicle motion in response to receiving an override command.

* * * * *